United States Patent [19]

Sumida et al.

[11] 4,071,889
[45] Jan. 31, 1978

[54] CENTRAL PROCESSING APPARATUS FOR GENERATING AND RECEIVING TIME DIVISION MULTIPLEX SIGNALS

[75] Inventors: Shizuo Sumida; Kazuo Nii, both of Hiroshima; Osamu Shimizu, Himeji; Atsushi Ueda, Himeji; Mitsuaki Ishii, Himeji, all of Japan

[73] Assignee: Mitsubishi Denki Kabushiki Kaisha, Tokyo, Japan

[21] Appl. No.: 707,512

[22] Filed: July 22, 1976

Related U.S. Application Data

[63] Continuation of Ser. No. 492,715, July 29, 1974, abandoned.

[30] Foreign Application Priority Data

July 28, 1973 Japan .................................. 48-85163

[51] Int. Cl.² .................................................. G06F 3/04
[52] U.S. Cl. .................................................. 364/200
[58] Field of Search ................ 340/172.5, 163; 445/1; 179/15 BS; 364/200, 900

[56] References Cited

U.S. PATENT DOCUMENTS

| | | | |
|---|---|---|---|
| 3,413,606 | 11/1968 | Cichanowicz et al. | 340/163 |
| 3,611,311 | 8/1969 | Andrews | 340/172.5 |
| 3,639,838 | 1/1968 | Kuhn et al. | 179/15 BS |
| 3,651,484 | 3/1972 | Smeallie | 340/172.5 |
| 3,697,959 | 10/1972 | Abramson et al. | 340/172.5 |
| 3,761,889 | 9/1973 | Hallee | 340/172.5 |
| 3,766,531 | 10/1973 | Cooper | 340/172.5 |
| 3,797,901 | 10/1973 | Black et al. | 340/172.5 X |

*Primary Examiner*—Harvey E. Springborn
*Attorney, Agent, or Firm*—Oblon, Fisher, Spivak, McClelland & Maier

[57] ABSTRACT

A central processing apparatus for use in a system which includes a plurality of remote electrical devices and a multiplex signal transmission line coupled to each of the plurality of devices. The central processing apparatus comprises an input unit coupled to the multiplex signal transmission line for receiving state signals from the plurality of devices in a time division multiplex format representing the states of the plurality of devices; an output unit coupled to the multiplex signal transmission line for transmitting logically processed signals to the plurality of devices in a time division multiplex format to control the plurality of devices; a logic processor responsive to the receiving of the state signals to generate the logically processed signals; a memory coupled to the logic processor, the input unit, and the output unit, for storing the state signals received from the plurality of devices and the logically processed signals generated by the logic processor; and a stored program control section coupled to the memory, the logic processor, the input unit, and the output unit for controlling the operation thereof.

3 Claims, 9 Drawing Figures

CENTRAL PROCESSING APPARATUS FOR GENERATING AND RECEIVING TIME DIVISION MULTIPLEX SIGNALS

This is a continuation of application Ser. No. 492,715, filed July 29, 1974 now abandoned.

BACKGROUND OF THE INVENTION

1. Field of the Invention

The present invention relates to a control apparatus for controlling a plurality of electrical devices in a time division multiplex system. More particularly, it relates to a central processing apparatus for centrally processing signals from a plurality of the electrical devices.

2. Description of the Prior Art

Time division multiplex systems and frequency multiplex system have been employed to transmit signals through small number of lines to a plurality of electrical devices. Time division multiplex systems have been employed particularly when the number of signals to be transmitted is large. Time division multiplex devices include various coding techniques such as PCM systems, PPM systems, etc. These systems have been conventionally used for communications, data transmissions etc. However, these systems are quite complicated and of high cost as they are designed to transmit high quality signals. The conventional systems are too complicated to be practical in transmitting simple data signals, such as ON-OFF signals of switches over relatively short communication distances such as in a ship, a train, a car, a factory, and the like.

It has accordingly been proposed to detect signals by transmitting a clock timing signal and data signals carrying the information of the electrical devices in 1 - 2 bits, transmitting the data signal in return and detecting the data signals by using the clock timing signals to detect predetermined addresses. The multiplex signals can be pretransmitted by this type of system in quite a simple manner relative to PCM or equivalent systems.

SUMMARY OF THE INVENTION

It is therefore one object of the present invention to provide a central processing apparatus which collects signals from many signal sources, such as control switches or electrical devices, and which generates processing command signals to be applied to the electrical devices depending upon the received signals using simplified time division multiplex equipment.

Briefly, this and other objects of the invention are achieved by providing a central processing apparatus which comprises a control unit which generates various timing signals for producing a time division multiplex signal and which controls the read-in, read-out and logical processing of signals in the central processing apparatus. Signals returned from the terminal processing devices are received by an input processing unit and are selected by the instructions from a control unit for storage in a memory. Logical processing of stored information is performed at a processor under the instructions of the control unit and the results are again stored in the memory. Stored data is fed out through output processing section to a multiplex signal transmission line upon receiving instructions from the control unit. Accordingly, it is possible to provide a central processing apparatus for a time division multiplex system which has a simple structure and furthermore has a convertible structure as the devices of the component blocks can be prepared by using commercially available I.C.s, and if necessary, using a single special I.C. Modifications of the control system are also easily attained by changing the control unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 2:
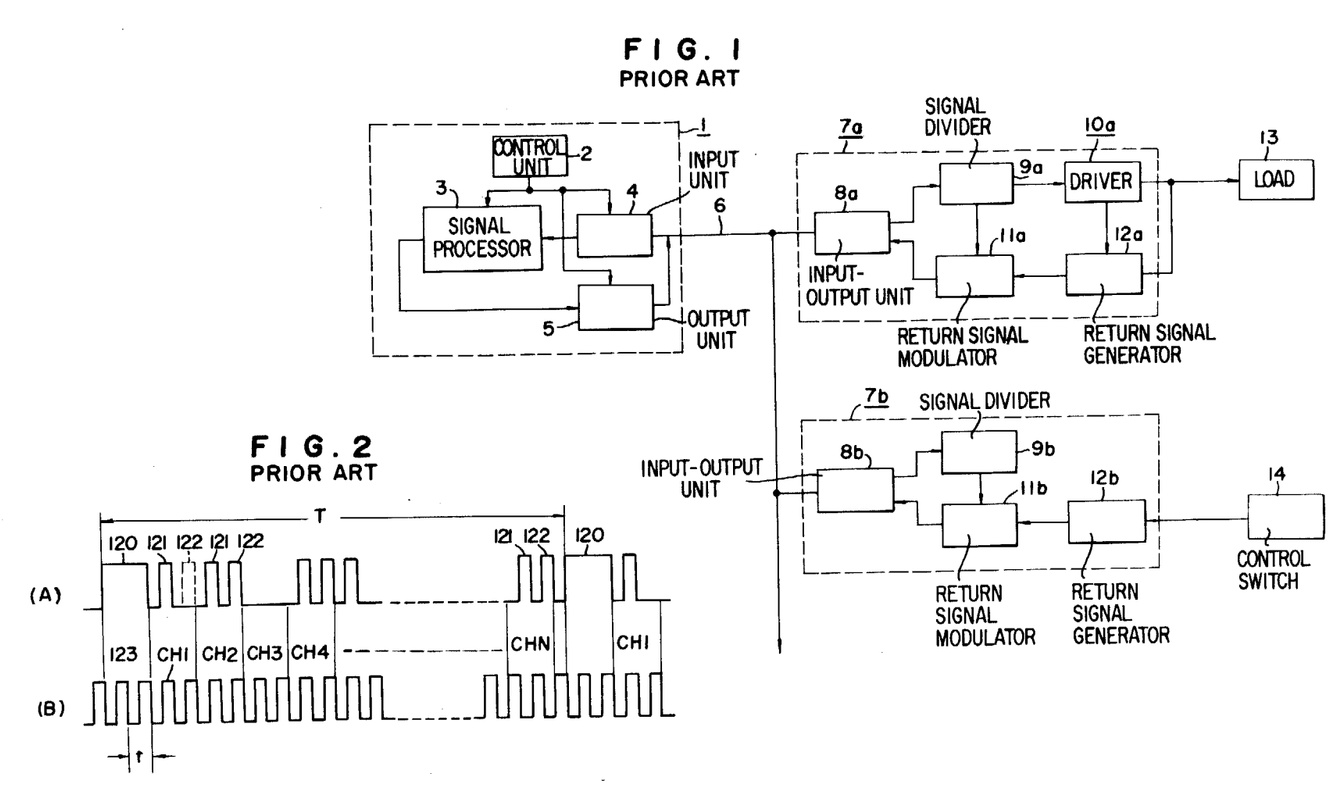
FIG. 1 is a block diagram showing a typical time division multiplex system.
FIG. 2 shows wave-forms of the time division multiplex signals in the system of FIG. 1.

Referring now to the drawing, wherein like reference numerals designate identical or corresponding parts throughout the several views, and more particularly to FIG. 1 thereof, one embodiment of a typical time division multiplex multiple system is illustrated. In FIG. 1, the reference numeral 1 designates a central processing apparatus, 2 designates a control unit, 3 designates a signal processor, 4 designates an input unit, 5 designates an output unit, 6 designates a multiplex signal transmission line, 7a, 7b designate terminal processing devices, 8a, 8b designate input-output units, 9a, 9b designate signal dividers, 10a designates a driver, 11a, 11b designate return signal modulators, 12a, 12b designate return signal generators, 13 designates an electrical load, and 14 designates a control switch.

In FIG. 1, only one set of terminal processing devices 7a, 7b, along with the electrical load 13 and the control switch 14 are shown, although others can clearly be added.

FIG. 2 shows the multiplex signal wave-form in the multiplex signal transmission line 6. FIG. 2a shows the data signal wave-form and FIG. 2b shows the clock signal wave-form wherein 120 designates a synchronizing signal pulse, 121 designates an instruction signal pulse, 122 designates a fault signal pulse, 123 designates a clock pulse and T designates the frame period of the multiplex signal, while $t$ designates the period of the clock signal.

Referring to FIG. 2, the operation of the embodiment of FIG. 1 will now be described. In FIG. 2, the clock signal E provides a time reference for the time division multiplex signals which is a pulse signal having a constant repetion period $t$ and is commonly transmitted to all of the system. In the data signal of FIG. 2a, the synchronizing signal 120 provides the zero time reference for time mesurement of the multiplex signals, and it is repeated at the constant frame period T. The instruction signal 121 and the fault signal 122 are shown as one width of the clock pulse 123, while the width of the synchronizing signal 120 corresponds to two of the clock pulses 123. In order to identify the synchronizing signal various techniques are known such as changing the pulse width or changing the pulse polarity, etc. The data is transmitted by the time division multiplex signals to the various electrical devices after the transmission of the synchronizing signal 120.

FIG. 2 shows the wave-forms where data is transmitted to N types of the electrical devices. The time periods reserved for each of the electrical devices are shown by the channel times periods $CH_1, CH_2, \ldots CH_N$. The time displacement from the synchronizing signal 120 of each channel time period is shown as the channel address. As is clear from FIG. 2a, the channel times are repeated in the frame period T as are the synchronizing pulses 120. Thus, signals corresponding to each of the electrical devices are transmitted and received during each time period T.

The signals corresponding to the electrical devices are shown as two pulses of the clock signal 123, wherein the first of the two pulses is the instruction signal pulse 121 for the operation of the electrical devices and the second is the fault signal pulse 122 for detecting a fault in the electrical devices. In operation, the central processing apparatus 1 transmits the clock signal shown in FIG. 2b, the synchronizing pulse 120 of the data signal of FIG. 2a and the instruction signal pulse 121 corresponding to the electrical load. The terminal processing device 7 transmits, in return, the fault signal pulse 122 and the instruction signal pulse 121 corresponding to the control switch. The instruction signal pulse 121 can be transmitted from the central processing device 1 or it can be transmitted as a return signal from the terminal processing device 7. For the electrical load 13 in the instruction signal pulse should be transmitted from the central processing apparatus 1 while for the control switch 14 it should be transmitted from the terminal processing device 7. Accordingly, it is clear that whether the electrical device is an electrical load 13 or a control switch 14, the channel times are alloted such that signals are not generated at the same time from both of the devices 1 and 7.

In the central processing apparatus of FIG. 1, the control unit 2 controls the operation of all of the apparatuses receiving from the reference oscillator circuit the clock signal 123, the synchronizing signal 120 and the reference signal for the time division multiplex signal. The control unit 2 also controls read-in and read-out of signals at the central processing apparatus 1 and further controls the logic processing.

In the input unit 4, the instruction signal 121 and the fault signal 122 returned from the terminal processing devices 7a, 7b are received in a conventional buffer circuit in which a level conversion of the signal from the multiplex signal line 6 is performed to provide a signal level capable of processing in the central processing apparatus 1, whereby the internal circuits are protected from line surge, and the like. The requested data is selected from the signals received in the buffer circuit under the control of the control unit 2 and is applied to the signal processor 3. The data selected by the input unit 4 is received in the signal processor 3, whereby the instruction signal corresponding to the electrical load 13 is generated by a predetermined logic control function. The instruction signal is applied to the output unit 5, and is transmitted through the multiplex signal line 6 under the control of the control unit 2 as the instruction signal pulse 121 in the predetermined channel time period, and simultaneously the synchronizing signal 120 is transmitted through the multiplex signal transmission line 6. The signal transmitted from the output unit 5 is passed through a conventional buffer circuit disposed in the last stage of the output unit 5 whereby the signal level is appropriately regulated. The multiplex signals become immune to external noise by the processing in the buffer circuit, and the interior circuits are protected from the line surge, and the like. The clock signal 123 generated in the control unit 2 is also fed out through a conventional buffer circuit disposed in the output unit 5 to the multiplex signal transmission line 6. The multiplex signal transmission line 6 is connected to the central processing apparatus 1 and to the terminal processing devices 7a, 7b, as is clear from the FIGURES, whereby the data signal of FIG. 2a and the clock signal of FIG. 2b are transmitted.

The terminal processing device 7a corresponding to the electrical load 13 will now be described in more detail. The input-output unit 8a comprises a conventional buffer circuit, which is preferably the same as that in the input unit 4 and in the output unit 5 in the central processing apparatus 1. In the input-output unit 8a, the clock signal and the data signal in the multiplex signal transmission line 6 are received, converted to the proper signal level and transmitted to the signal divider 9a. The signal divider 9a receives the clock signal and the data signal to decode the sychronizing signal 120. As the width of the synchronizing signal 120 corresponds to two clock pulses, the synchronizing signal can be identified and separated out by counting the clock signals, whereby a time reference for counting is readily obtained. In the signal divider 9a, the channel time period alloted to the electrical load 13 is detected by counting the clock signals from the time reference in accordance with the predetermined addresses, and the data signal in the first half of the channel period is also detected and separated out. In the driver 10a, the data separated out in the signal divider 9a is demodulated. As the data signal is a time division signal and it is only transmitted as quite a small part of the information in the frame period T, the signal is stored for one period T until the signal of the next period is transmitted. In the driver 10a, the demodulated signal is amplified to drive the electrical load 13.

The return signal generator 12a detects a fault state of the electrical load 13. The fault state is sensed by detecting the potential at the connection between te driver 10a with the electrical load 13 to determine whether the load 13 is in the On state of the OFF state. In the return signal modulator 11a, the fault signal generated by the return signal generator 12a is returned as a fault signal pulse 122 in the second half of the channel time period, which is separated out in the signal divider 9a. The fault signal pulse 122 is transmitted through the buffer circuit in the input-output unit 8a to the multiplex signal transmission line 6.

The terminal processing device 7b corresponding to the control switch 14 will now be described in more detail. The input-output unit 8b is the same as the input-output unit 8a. The signal divider 9b separates out the synchronizing signal 120 in essentially the same manner as the signal divider 9a, whereby the channel time period alloted to the control switch 14 is detected. However, the instruction signal is not transmitted to the control switch 13 whereby it is unnecessary to divide the data signal, and it is thus unnecessary to have a driver. In the return signal generator 12b, the ON and OFF operation or the fault state of the control switch 14 are detected. In the return signal modulator 11b, the instruction signal of the control switch detected by the return signal generator 12b is transmitted in the first half of the channel time period determined in the signal divider 9b and the fault signal is transmitted in the second half of the channel time period. The instruction signal and the fault signal are respectively passed through the input-output unit 8b to be transmitted to the multiplex signal transmission line 6 as the instruction signal pulse 121 and the fault signal pulse 122.

In the described embodiment, only one terminal processing device 7a, connected to the electrical load 13, and one terminal processing device 7b connected to the control switch 14 are illustrated. When additional electrical devices are connected, a corresponding number of additional terminal processing devices are naturally required.

Figure 3:
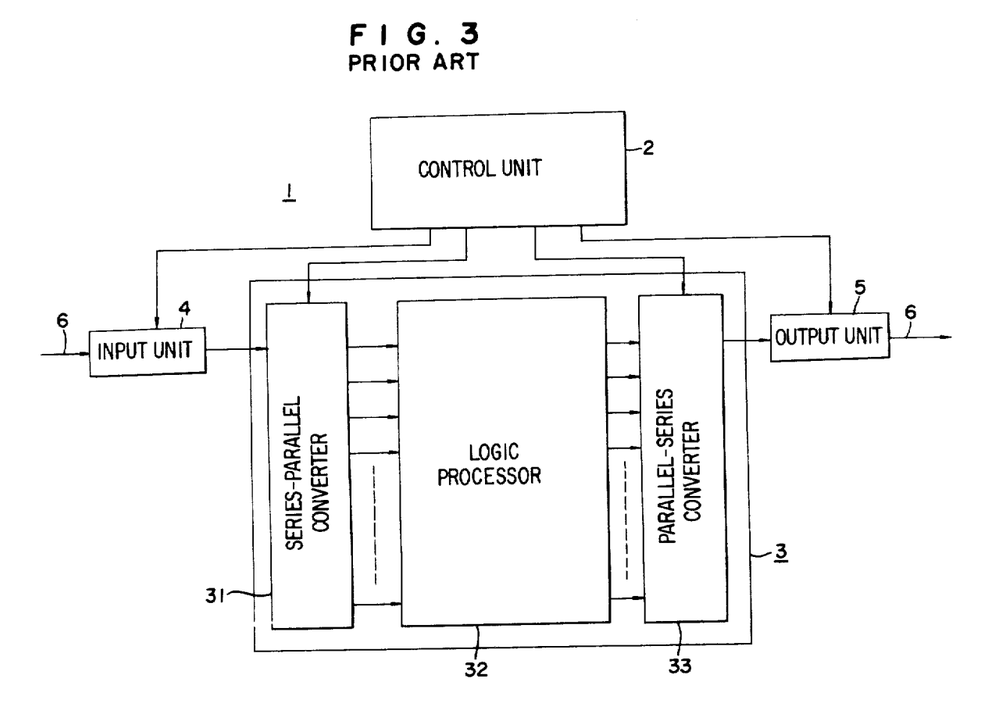
FIG. 3 is a block diagram of a conventional central processing apparatus.

FIG. 3 is a more detailed block diagram of a conventional central processing apparatus 1 employed for controlling electrical devices on a time division multiplex system. In FIG. 3, the reference numeral 31 designates a series-parallel converter, 32 designates a logic processor and 33 designates a parallel-series converter. The illustrated conventional central processing apparatus will now be described in greater detail. Since it is an especially important function of the apparatus 1 to generate instruction signals for the electrical loads from the return signals from the various corresponding terminal processing devices, this problem will be discussed in particular detail.

The voltage level conversion of the signal returned from the terminal processing device 7 through the multiplex signal transmission line 6 is performed by a conventional buffer circuit in the input unit 4, to provide a voltage level capable of being processed in the central processing apparatus 1. The signal is selected by a read-in control command from the control unit 2, and is passed to the signal processor 3 as an input. As the signal of the input unit 4 comprises series signals which are in time division, they are converted into parallel signals by the series-parallel converter 31. The series-parallel converter 31 comprises a conventional series input-parallel output type shift register and a bi-stable device for storing the parallel output of the shift register, such as a conventional delay type flip-flop. At the output of the series-parallel converter 31, one of the signals selected from the fault signals of the electrical load transmitted from the terminal processing devices 7, the returning instruction signals and the fault signals returned from the control switches by the input unit 4 and the selected signals are demodulated from the time division signal to a DC signal. The number n of signals among the return signals are applied to the logic processor 32, wherein the instruction signals for operating the electrical load to the input are generated. That is, all of the logic states for operating the electrical loads are set by the logic circuit. For example, when a device C is operated under the AND state, having two inputs A and B, the device comprises an AND circuit receiving A and B as inputs whose output is C. The other states are set the same.

The logic processor 32 can be formed of a conventional AND gate, an OR gate, a NOT gate, a flip-flop circuit and a timer circuit. The parallel signals applied to the logic processor 32 are processed in parallel to generate a number m of parallel load operation signals. The load operation signals are converted by the parallel-series converter 33 from parallel signals to series signals as the time division output signal. The parallel-series converter 33 comprises a parallel-input-series-output type shift register or multiplexer. The output of the logic processor 32 is sequentially provided by a read-out control instruction from the control unit 2 so as to output a desirable signal in a desirable time period. The voltage level conversion of the output is performed by the buffer circuit in the output circuit 5, and the resulting signal is transmitted through the multiplex signal transmission line 6 to the terminal processing devices 7.

In each of the terminal processing devices 7, the electrical load is driven by the instruction signal as described in the embodiment of FIG. 1. In the central processing apparatus 1 having the described structure, the time for logic processing can be quite short and the structure of the logic processor 32 is quite simple. However, when the desired logic states or programmed functions are changed, the logic processor 32 must be modified or rewired. Accordingly, it may be inconvenient to form the logic processor 32 from a single I.C.

The numbers of the input-output of the logic processor 32 are ($n + m$). Accordingly, the logic processor may be quite a complicated structure when many signals are processed, and it is hard to make the entire device of a single I.C. because of the increased number of terminals required. In the series-parallel converter 31, the number of parallel output terminals increases depending upon the number of the signals. In fact, a complicated structure is required for processing several tens of parallel signals even though it is formed of an I.C. When the series-parallel converter 31 is formed of a single specific I.C., the interior circuits can be easily formed, but the number of terminals may be limited. The same is true for the parallel-series converter 33.

In accordance with the present invention, it is possible to provide a central processing apparatus for conforming to any change of logic states or programming which can be formed with commercially available I.C.s, or with single specific I.C. so as to overcome the above described disadvantages.

Figure 4:
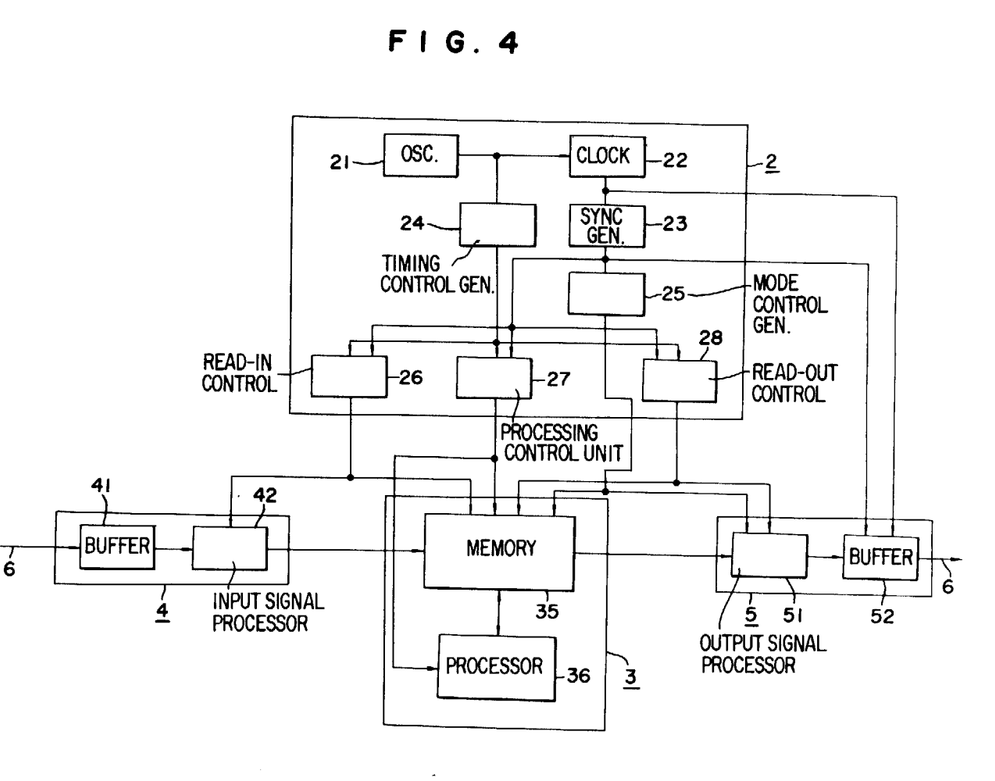
FIG. 4 is a block diagram of one embodiment of the central processing apparatus according to the invention.

Referring now to FIG. 4, one embodiment of the present invention will be described in detail. In FIG. 4, the reference numeral 21 designates an oscillator, 22 designates a clock signal generator, 23 designates a synchronizing signal generator, 24 designates a timing control generator, 25 designates a mode control generator, 26 designates a read-in control, 27 designates a processing control unit, 28 designates a read-out control, 35 designates a memory, 36 designates a processor, 41 designates a buffer circuit, 42 designates an input signal processor, 51 designates an output signal processor, and 52 designates a buffer circuit. Referring to the wave-forms of FIG. 2, the operation of the embodiment of FIG. 4 will now be described.

The oscillator 21 is a conventional oscillation circuit for producing a rectangular wave-form pulse having a constant frequency. The pulse is used for generating the multiplex signals as stated below and is also used for controlling in the central processing apparatus 1. Accordingly, the frequency of the oscillator is set above the maximum value of the required timing signal. The oscillator 21 can be formed of a conventional astable multivibrator or of a quartz oscillating circuit. The clock signal generator 22 generates the clock signal pulse 123 having the time period t of FIG. 2b and may be formed of a suitable frequency division of the pulse generated by the oscillator 21. The clock signal generator can be formed of a conventional counting circuit. The synchronizing signal generator 23 generates the synchronizing signal pulse 120 having the time period T and the pulse width 2t of FIG. 2a and may be formed by frequency division of the clock signal pulse 123 generated by the clock signal generator 22. The synchronizing signal generator 23 is formed of a conventional counting circuit.

Figure 5:
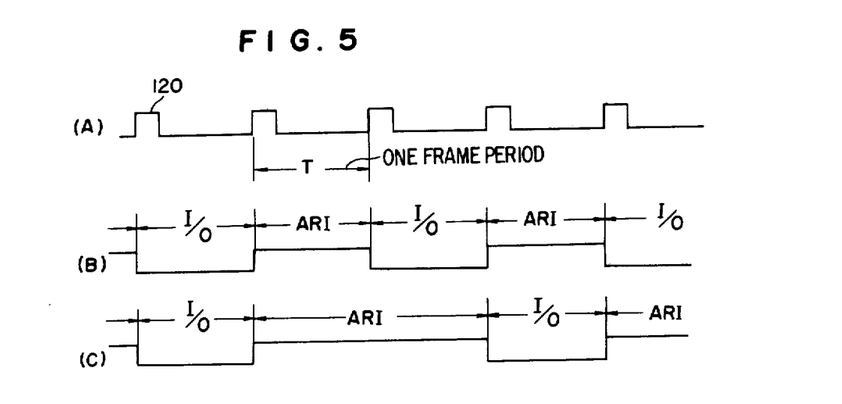
FIG. 5 shows timing wave-forms illustrating the operation of the embodiment of FIG. 4.

The control timing generator 24 generates the timing signal required for processing the signals in the read-in control 26, the processing control unit 27, the read-out control 28, and the signal processor 3, whereby a timing signal having the required frequency and pulse width is generated from the pulse signal of the oscillator 21. The timing control generator 24 may be formed of a conventional counting and gate circuits. The mode control generator 25 generates the control mode for indicating whether an input-output operation or a processing operation is being performed in the signal processor 3. In each period (or frame) of the multiplex signal beginning from the synchronizing signal 120, the mode control generator indicates whether an input-output or a processing operation is being performed in the frame. One example of the mode control is shown in FIG. 5. FIG. 5a is a data signal wave-form including only the synchronizing signal 120 for about 5 frames. FIG. 5 is a mode control signal showing the processing and input-output operations of the signal performed alternatively in each frame. That is, the input-output operation for the signal I/O is set in the first frame, and the processing ARI is set in the second frame, and they are alternatively repeated.

FIG. 5c is another control mode, wherein the processing period is prolonged to 2 frames when the processing is not finished within 1 frame. As stated above, the control mode indicates the read-in and the read-out of the signal and processing per frame of the time division multiplex signal. The mode control generator 25 may be formed of a conventional counting circuit for counting the synchronizing signal 120. The read-in control 26 controls the read-in of signals to the signal processor 3.

In the I/O period indicated by the mode control generator 25, the read-in control 26 supplies information to the input processor 4, depending upon the timing signal of the timing control generator 24, and provides the address of the memory 35 for storing the input signal by selecting the read-in input signal. The processing control unit 27 controls the logic processing for supplying the instruction signals to the electrical devices for the input of signal data stored in the memory 35 by the read-in control 26. In the ARI period designated by the mode control generator 25, the data for processing is read-out from the memory 35 to the processor 36 depending upon the timing signals of the timing control generator, and logic processing of the read-out data is performed and the results of the processing step is again stored in the memory 35. During the processing step, the processing control unit 27 provides the required address to the memory 35 and also provides processing instructions to the processor 36. The read-out control 28 controls the reading-out of the instruction signal from the memory 35 for transmitting the load operation signal from the logic processing step to the terminal processing devices as multiplex signals. In the I/O period designated by the mode control generator 25, the read-out control directs the output unit 5 to supply the required address to the memory 35 and further directs reading out the instruction signal data and transmitting the instruction signal over the multiplex signal transmission line 6, depending upon the timing signals of the timing control generator 24. In the input unit 4, the voltage level conversion of the return signal from the terminal processing devices is performed by the buffer circuit 41 to convert it to a voltage level capable of being processing in the central processing apparatus 1. The buffer circuit 41 also prevents voltage surges through the multiplex signal transmission line 6 from entering the processing network. The input signal processor 42 accepts the signal from the buffer circuit 41 depending upon instructions received from the read-in control 26 and applies accepted signals to the signal processor 3. Within the signal processor 3, the memory 35 stores various signal data and is controlled generally by instructions from the control unit 2.

As stated above, when the I/O mode is directed by the mode control generator 25 (FIG. 5), the appropriate instructions are fed to the read-in control 26 and the read-out control 28. When a signal is read-in, acceptance of the signal is directed by the read-in control 26 and the signal is fed to the input signal processing unit 42. Only the required data is input to the memory 35 and is simultaneously stored in the address of the memory 35 designated by the read-in control 26.

When the ARI mode is directed by the mode control generator 25 (FIG. 5), the data of the memory 35 is transmitted only between the memory and the processor 36. That is, data from the memory 35 is sequentially fed to the processor 36 upon receiving the instructions from the processing control unit 27. In the processor 36, logic processing of the input data is performed and the processing result is again stored in the memory 35 depending upon the instructions of the processing control unit 27.

The logic processor will now be described in more detail referring to FIG. 6. When the signal is read out from the memory 35, the I/O mode is designated. The read-out control 28 is operated during the I/O period to provide address information to the memory 35 for transmitting the multiplex signals, and to read out the data. The output data is applied to the output signal processor 51 which comprises a conventional buffer memory device for temporarily storing the output signal for one frame. The signal which is temporarily stored in the output signal processor 51 during the I/O period, is output through the multiplex signal transmission line 6 in the ARI period, and is stored in the buffer memory device of the output signal processor 51. When the I/O period is begun in the next frame, new data is transmitted from the memory 35 to the output signal processor 51 and the temporarily stored data is fed out through the multiplex signal transmission line 6. During the ARI period, signal data cannot be read-out from the memory 35. Accordingly, the buffer memory is provided in the output signal processor 51 whereby the same signal is repeatedly transmitted in two frames.

When the processing period and the ARI period of FIG. 5c are prolonged to two frames, the same signal is repeatedly transmitted in three frames. However, even in this case, it is sufficient to instruct the proper mode of FIG. 5c using the mode control generator 25. The signal of the output signal processor 51 is fed out as the instruction signal to the electrical loads in the proper channel time period depending upon the instructions of the read-out control 28. Voltage level conversion of the signals from the output signal processor 51 is performed by the buffer circuit 52, and its output is applied to the multiplex signal transmission line. Voltage level conversion of the clock signal generated by the clock 22 and of the data signal generated by the synchronizing signal generator 23 are also performed by the buffer circuit 52 and these signals are subsequently applied to the multiplex signal transmission line 6. The buffer circuit 52 converts the voltage level in the central processing apparatus 1 to a higher voltage level so as to reduce the effects of external noise, to perform an impedance conversion and to supply power to the signal so as to drive the multiplex signal transmission line 6. In the read-in control 26, the processing control 27 and the read-out control 28, as in the control unit 2, the structure may be determined depending upon the allotment of the electrical loads and the control switches in the control devices and the modes of control among the electrical devices, i.e. the operating mode thereof. The structure of these devices may be the same, and accordingly, they can be formed by the conventional read only memories (ROMs). When the control conditions are to be changed, it is necessary only to change the content of the read only memory (ROM). Alterable read only memories are commercially available accordingly such devices are preferably used. When a single specific I.C. including an alterable ROM is used, the control processing apparatus 1 may be constructed so as to be easily modified for use in many different environments. The memory 35 may conveniently be a writing-reading memory, i.e. a random access memory (RAM) for writing the input data and reading out the data. Various types of the random access memories made of I.C.s have been commercialized. Accordingly, the RAM can be easily employed using commercially available components.

Figure 6:
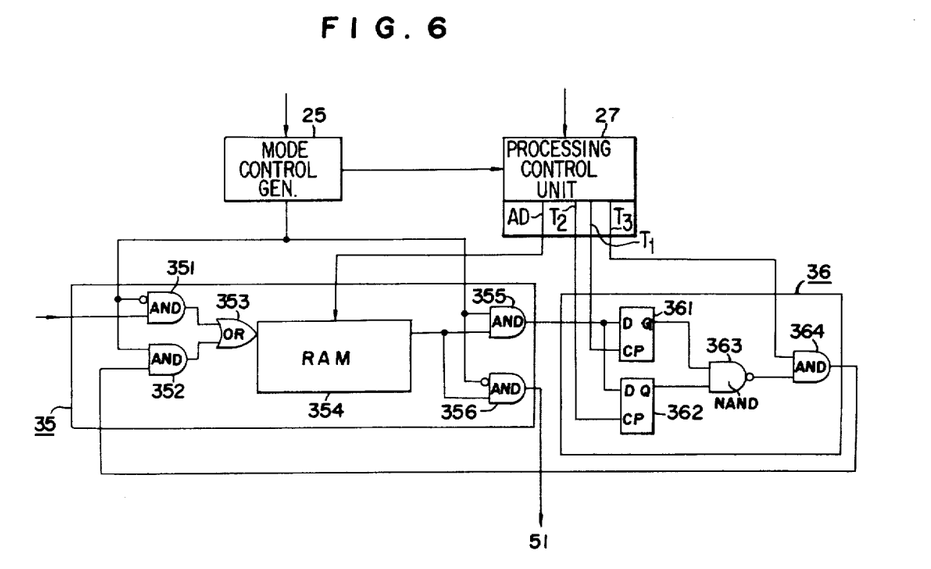
FIG. 6 is a block diagram illustrating in more detail the processing components in the embodiment of FIG. 4.

Referring to FIG. 6, a specific example of a processor is shown. In FIG. 6, only the parts related to the processor of the embodiment of FIG. 4 are shown. In FIG. 6, the reference numeral 351 designates an AND gate which has a negation input, 352 designates an AND gate, 353 designates an OR gate, 354 designates a random access memory RAM, 355 designates an AND gate, 356 designates an AND gate which has a negation input, 361 and 362 designate bi-stable latches, 363 designates a NAND gate and 364 designates an AND gate. The processing control unit 27 is shown as including an address command terminal AD and timing terminals $T_1$, $T_2$, $T_3$.

The operation of the FIG. 6 device will now be described. The I/O instruction is given in the frame which is next to the frame receiving the processing instruction from the mode control generator 25. The signal selected at the input signal processor 42 by the control instruction of the read-in control 26 is stored in a specific part of the memory device 354. When the instruction for the I/O period is supplied from the mode control generator 25, the AND gates 351 and 356 of the memory 35 are in the ON state, whereby the signal of the input signal processor 42 is fed through the AND gate 351 and through the OR gate 353 to the memory device 354. Signals from the memory device 354 are fed out through the AND gate 356 to the output signal processor 51. The signal data in the memory device 354 is processed during the ARI period. The AND gates 352 and 355 are turned on by the ARI period instruction, whereby the memory device 354 is connected to the processor 36 and the processing control 27 is operated to give the processing command. The processing control 27 designates the signal data within the memory device 354, and the address instruction is accordingly supplied from the terminal AD, while the processing of the signal data is directed by signals from the three timing terminals $T_1$, $T_2$, $T_3$. In the instructions for the first data being processed, the address of the data is supplied from the terminal AD and also an instruction signal is applied to the terminal $T_1$ whereby the data is stored in the bi-stable latch 361. When the second data is to be processed, the address of the data is supplied through the terminal AD and the instruction signal is applied to the terminal $T_2$ whereby the second data is stored in the bi-stable latch 362. The bi-stable latches 361, 362 may be formed of conventional delay type flip-flops (i.e. D flip-flops). The input signals applied to the terminal D are read in when the input is applied to the terminal, and the signal is passed to the terminal Q. The signal at the terminal Q is stored until next new signal is read in. The bi-stable latches 361 362 each store 1 data bit.

NAND processing of the data read into the bi-stable latches 361, 362 is provided by the NAND gate 363. The AND gate 364 is turned on by an instruction from the terminal $T_3$, and the address information is supplied from the terminal AD and the NAND processing result is stored in the appropriate address. As described above, the NAND processing is performed in three steps. All types of logical processing can be performed by the NAND processing. Accordingly, such processing may be accomplished by repeating the NAND processing. In the processing control circuit 27, the program for the address command and the timing command should be supplied so as to perform the required processing. A practical program for the required processing is easily provided when the required logical processing is determined. Accordingly, the processing control unit 27 is formed of the programmed read only memory (ROM) having the selected program. The signal for operating the processing control unit 27 is supplied from the timing control generator 24. NAND processing by the NAND gate can, of course, be replaced with NOR processing using a NOR gate, although the structure of the processing control unit 27 should be changed in the latter case. It is better to employ either NAND or NOR processing so as to provide small processing steps in the processing control unit 27 for the required logical processing. In the described case, the processing of two data values by the two bi-stable latches 361, 362 is possible. However, it is also possible to process three or more data values using three or more bi-stable latches. It is also possible to perform a plurality of processings or tests by employing AND, OR, NOT, NAND, NOR, etc. gates which are switched depending upon instructions from the processing control unit 27. In the processing, it is also possible to employ not only the gates but also various types of flip-flops or conventional processing circuits, etc., In the described embodiment, only address commands are discussed as the instructions for the memory device 354. However, it is also necessary to provide the conventional read/write instructions, and the timing by a strobe input. These basic requirements are not discussed in detail as they are clearly understood to those skilled in the art from the above discussion.

Figure 7:
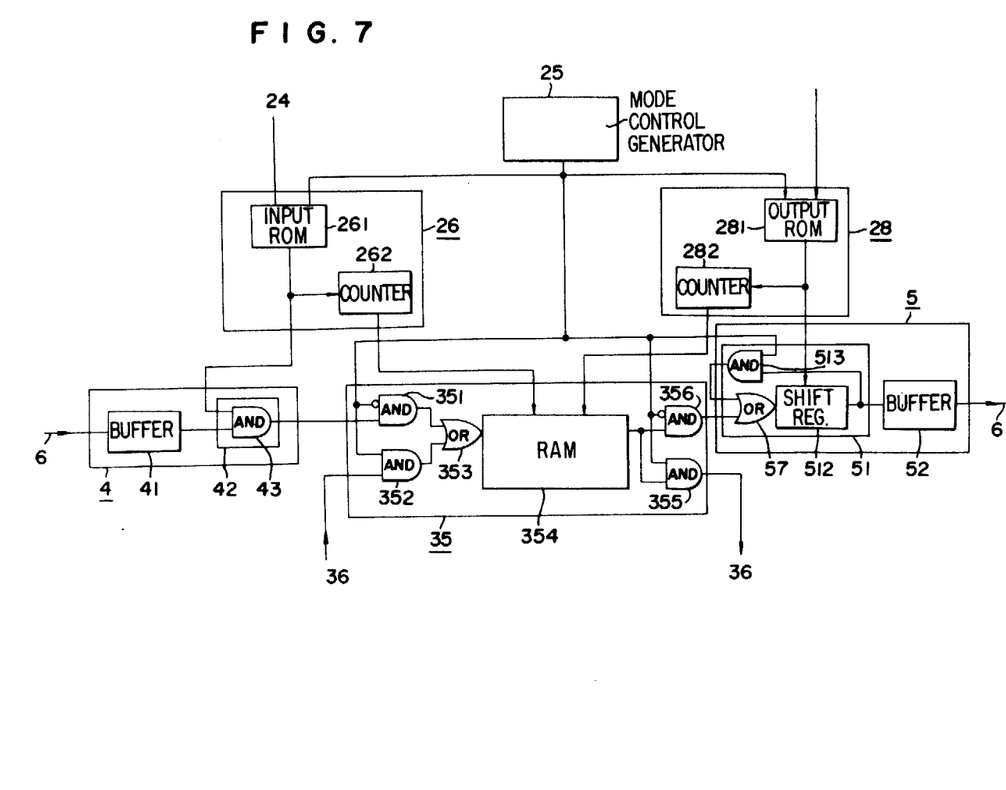
FIG. 7 is a block diagram illustrating in more detail the signal input and output components of the embodiment of FIG. 4.

Referring to FIG. 7 showing one embodiment of a control for reading the signal data in and out, and controlling the input-output signal processor will now be discussed in detail. In FIG. 7, the reference numeral 261 designates a read only memory (ROM) for input data, 262 designates a counting circuit, 281 designates a read only memory (ROM) for output data, 282 designates a counting circuit, 43 designates an AND gate, 511 designates an OR gate, 512 designates a shift register, and 513 designates an AND gate. The operation of the embodiment of FIG. 7 will now be described. During the I/O period, the AND gates 351, 356 are in the ON state in the memory 35 whereby the input unit 4 is connected to the memory device 354 and the memory device 354 is connected to the output unit 5 and the operation command is applied to the read-in control 26 and to the read-out control 28 so as to operate these circuits. Reading in and reading out of the signal data are performed during the I/O period, however, as the reading in and reading out are performed in one memory device 354, it is hard to perform both operations at the same time. Accordingly, it is necessary to divide the time period and to instruct the allotment of read-in and read-out intervals. This can be done easily.

As shown in FIG. 2, when either the electrical load or the control switch is alloted a channel period, reading out of the data from the memory device 354 is performed only when the instruction signal is provided as the signal of the central processing device 1 as the only operation signal pulse to the electrical load. Accordingly, the command is provided by the read-out control 28 only when the instruction signal is generated. The other signals are the signals returned to the central processing apparatus 1 and the instruction is supplied from the read-in control 26. Identification of the read-in and read-out portions of the I/O period, can be performed as stated above. The separated read-in and read-out steps will be further described. During read-in, the instruction and fault signals of the control switch and the fault signal of the electrical load are fed in through the buffer circuit 14 as the return signals. It is not always necessary to use all of the signals, and accordingly, only the required signal is fed into the memory device 354. When the signals are applied to the AND gate in the input signal processor 42, the instruction for turning on the AND gate 43 is supplied from the input read only memory (ROM) 261 if it is necessary to read in the signals. The counting circuit 262 provides memory address information for the memory device 354 and may be a known counter having the number of bits required for addressing the memory device 354. Accordingly, the data for reading in is passed through the AND gate 43 and is stored in the address designated by the counting circuit 262, and this operation is sequentially repeated.

The read-out operation will now be further described. As illustrated referring to FIG. 6, the instruction signals corresponding to the electrical loads are stored in the memory device 354 so as to be fed out in order as the output signal by the logic processing under the instruction of the processing control unit 27 in the ARI period. The read-out control 28 is operated by the signal designating the I/O period. The read-out command is provided from the output read only memory 281 during the time period for reading out the load operation data signals whereby the data designated by the counting circuit 282 for selecting the appropriate addresses of the memory device 354 is passed through the AND gate 356 to the output of the memory 35. The data is simultaneously passed through the OR gate 511 in the output signal processor 51 to be applied to the shift register 512 acting as a buffer memory. The counting circuit 282 gains one count in the next read-out period, whereby the next address in the memory device 354 is designated, the data is read out and is applied to the shift register 512, and this operation is sequentially repeated. The shift register 512 acting as the buffer memory comprises a number of bits corresponding to the read-out data.

As stated above, the data stored in the shift register 512 in the last I/O period is fed out sequentially from the first bit through the buffer circuit 52 for each input of new data read out from the memory device 354 to the first bit of the shift register 512. When the ARI period is begun the data is not read out from the memory device 354, whereby the data stored in the shift register 512 is fed out through the buffer circuit 52 to the multiplex signal transmission line 6 by the timing instruction of the output read only memory. At the same time the AND gate 513 is turned on, and accordingly, the data read-out from the shift register 512 is again read into and stored in the shift register 512. When new data from the memory device 354 is applied to the shift register 512 by the I/O period instruction, the data which was already stored therein is sequentially fed out through the multiplex signal transmission line 6. Thus, the processed data is repeatedly read out for two frames.

When the ARI period of FIG. 5c continues for two frames, the data is further recycled through the AND gate 513. Thus, the processed data is repeatedly read out three times. As it is clear from the above statement, the shift register 512 has the function of transmitting output signals during the frame in which the ARI period is programmed. In the embodiment of FIG. 7, the counting circuit 262 and 282 are employed for supplying address information to the memory device 354, whereby the data signals are sequentially read in and out in the desirable order during the read-in and read-out processes. When addresses of the memory device 354 are randomly selected it is possible to use only the read only memory instead of the counting circuits 262, 282. The input ROM 261 controls the read-in, and the output ROM 281 controls the read-out. Accordingly, it is possible to use only two of the ROMs.

Figure 8:
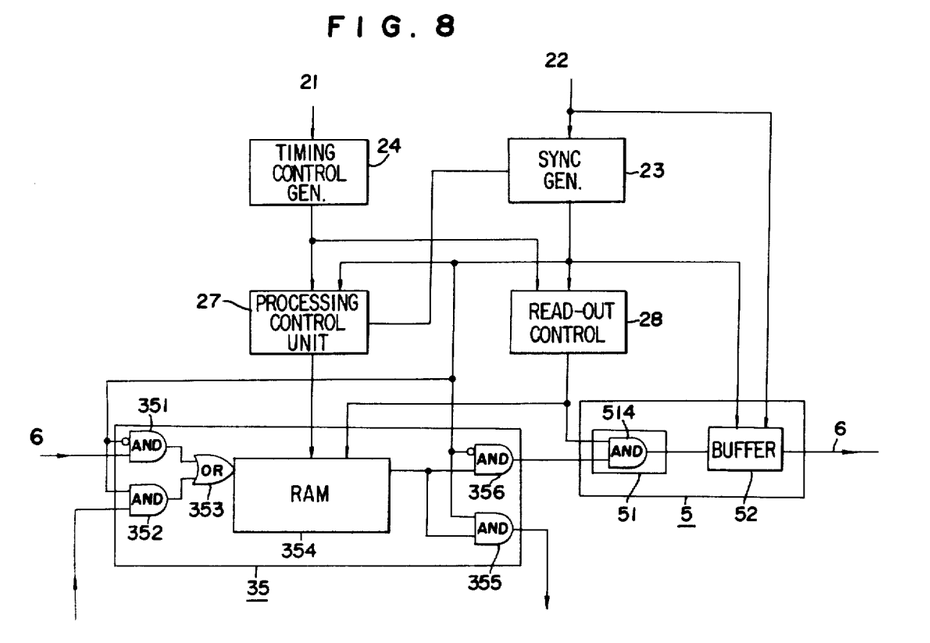
FIG. 8 is a block diagram of another embodiment of the present invention.

Attention is now directed to the embodiment of FIG. 8. In the embodiment of FIG. 4, the processing period and the signal input-output period were respectively provided in a single multiplex signal one frame unit. When the processing of FIG. 5 is completed within one frame, the processing period and the input-output period are alternatively provided as shown in FIG. 5b. When the processing is performed during two frames, the processing period endures for two frames as shown in FIG. 5c. However, in the above described system, even though the processing is completed within one frame, the result cannot be transmitted as an output signal until the frame has ended and the next input-output period begins, whereby the time for transmitting the desired information is delayed and a time loss occurs. Moreover, the output signal is transmitted even during the processing period, whereby it is necessary to use the shift register 512 as a buffer memory. However, in the demodulation of the time division signal at the terminal processing devices, the first frame signal is stored until the second frame signal is received after demodulation of the firsr frame. Accordingly, the signal does not change during the period of the synchronizing signal 120. By utilizing this fact, providing the processing period during the period of the synchronizing signal 120 can provide a technique of increasing the efficiency of the system. The embodiment based on these considerations is shown in FIG. 8, wherein the reference numeral 514 designates an additional AND gate. The operation of the embodiment of FIG. 8 will now be described. The difference between the embodiment of FIG. 8 and the other embodiments consists in that the mode control generator 25 and the shift register 512 are not used. The synchronizing signal 120 generated by the synchronizing signal generator 23 is the mode control for designating the processing period and the signal input-output period. As the technique for generating the synchronizing signal 120, i.e. the mode control, the clock signals 123 of the clock 22 are counted in the synchronizing signal generator 23 during the I/O period. After the completion of one period of the input-output signal is detected, the synchronizing signal 120 is immediately generated, whereby the processing period is begun so that the processing control unit 27 is instructed to perform the desired processing. During the processing period the synchronizing signal 120 continues. When the processing is completed, this fact is detected by the processing control unit 27, whereby the synchronizing signal 120 of the synchronizing signal generator 23 is stopped. The I/O period is then begun to start the signal input and output process.

The signal read-out will now be described. In the embodiment of FIG. 7, it is necessary to provide the shift register 512 in the output signal processor 51 to store one frame of the output signal. However, in the embodiment of FIG. 8, the output signal is directly fed out from the memory device 354 to the multiplex signal transmission line 6 by the I/O period instruction. That is, the AND gate 356 is turned on by the signal which initiates the I/O period, and the read-out control 28 is also operated. The read-out control 28 provides address information to the memory device 354 during the signal read-out period, and also turns on the AND gate 514. The signal from the memory device 354 is passed through the AND gates 356, 514 and the voltage level of the signal is converted in the buffer circuit 52 after which the converted signal is fed out to the multiplex signal transmission line 6.

Figure 9:
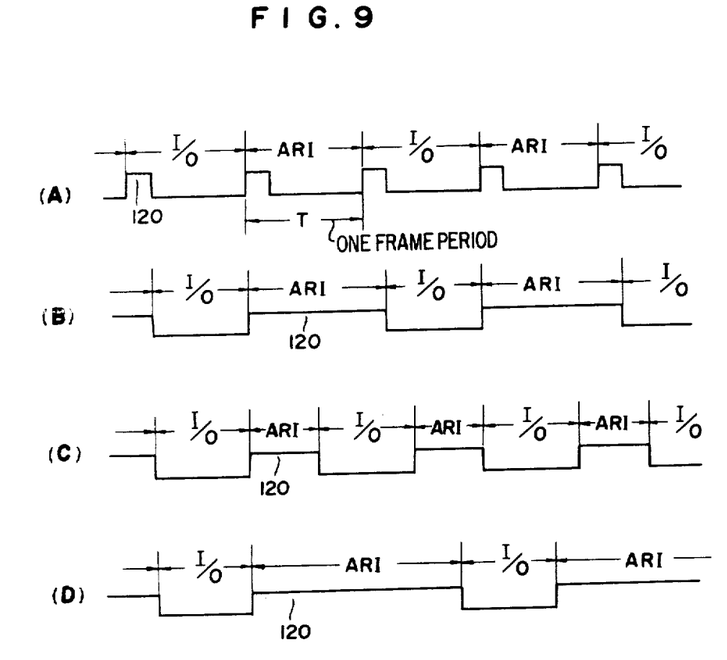
FIG. 9 shows timing wave-forms illustrating the operation of the embodiment of FIG. 8.

FIG. 9 shows the control mode of the synchronizing signal 120 for the embodiment of FIG. 8. FIG. 9a shows the mode control of FIG. 4 wherein the I/O period and the ARI period are repeated in each frame; FIG. 9b shows the mode control wherein processing is performed in about one frame. FIG. 9c shows the mode control wherein the processing is completed in quite a short period, and signal input and output are performed just after the processing to provide a high signal transmission efficiency. FIG. 9d shows a control mode wherein the processing takes more than one frame period. Even in the last case it is possible for the I/O period to input or output the signal at the completion of processing without waiting until the completion of the second frame. As stated above, in accordance with this embodiment, the multiplex signals are not transmitted as the synchronizing signal in the logic processing period, whereby the signal transmission can be accomplished with a high efficiency, and the shift register 512 as the buffer memory in the output signal processor 51 can be omitted.

In the above discussion, only control switches are employed as the signal source, however the signal source can also be any analogue signal. When an analogue signal is applied, the analogue signal is converted by a conventional analogue-digital converter circuit to a corresponding digital signal, whereby it is processed the same as with that of a control switch. One embodiment of such an analogue-digital converter circuit comprises an oscillator for generating a signal having a desirable constant frequency and a mono-stable multivibrator which is triggered by the output of the oscillator. The output pulse width of the mono-stable multivibrator is controlled by the analogue signal.

The memory device 354, the read-in control 26, the processing control unit 27 and the read-out control 28 can be constructed not only of a semiconductor memory but also of a core memory, a wire memory or other conventional memory devices.

In the described embodiments, the read-in and the read-out periods I/O period are in the same frame period. However it is possible to separate the I/O period into a discrete read-in and read-out periods. In the latter case, three control modes are provided whereby the read-in control 26, the processing control 27 and the read-out control 28 are separately operated. In this embodiment, the read-in signal for the memory 35 is selected by the read-in control 26.

Although all of the signals are returned from the terminal processing devices, only the needed signals are selected for reading-in. The other signals need not be returned. In order to provide a check in the control apparatus, it is possible to change the structure of the read-in control in the central processing device 1 so as to read only the fault signals.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a system including a plurality of remote electrical devices, and a multiplex signal transmission line coupled to each of the plurality of devices, a central processing apparatus comprising:

input means coupled to the multiplex signal transmission line for receiving state signals from the plurality of devices in a time division multiplex format representing the states of the plurality of devices;

output means coupled to the multiplex signal transmission line for transmitting logically processed signals to the plurality of devices in a time division multiplex format to control the plurality of devices;

logic processing means coupled to the input means and responsive to the receiving of the state signals for generating the logically processed signals;

a memory coupled to the logic processing means, the input means, and the output means, for storing the state signals received from the plurality of devices and the logically processed signals generated by the logic processing means and for transferring the logically processed signals to the output means; and stored program control means coupled to the memory, the logic processing means, the input means, and the output means for controlling the operation thereof.

2. The combination recited in claim 1 including:
a synchronizing signal generator having an input and an output, the output of the generator being connected to the stored program control means, for generating synchronizing signals to synchronize the receiving of the state signals and the transmitting of the logically processed signals the in time division multiplex format.

3. The combination recited in claim 2 including:
a clock signal generating circuit coupled to the input of the synchronizing signal generator for generating a clock signal of fixed frequency.

* * * * *